United States Patent [19]

Breedyk et al.

[11] Patent Number: 4,550,598
[45] Date of Patent: Nov. 5, 1985

[54] APPARATUS AND METHOD ADAPTED TO TEST TIRES BY ELIMINATING JITTER FROM DATA SIGNALS WITHOUT LOSING DATA

[75] Inventors: Frans N. Breedyk, Hunsdorf, Luxembourg; Guido van Gelderen, Amstelveen, Netherlands

[73] Assignee: The Goodyear Tire & Rubber Company, Akron, Ohio

[21] Appl. No.: 547,330

[22] Filed: Oct. 31, 1983

[51] Int. Cl.$^4$ .................................. G01M 17/02
[52] U.S. Cl. ..................... 73/146; 33/141 E; 375/81
[58] Field of Search .............. 73/146, 128, 129, 121, 73/490; 33/141 E, 141 R; 375/81

[56] References Cited

U.S. PATENT DOCUMENTS

| | | |
|---|---|---|
| 2,279,409 | 4/1942 | Milster et al. ............... 73/178 |
| 2,486,965 | 11/1949 | Milster ........................ 73/128 |
| 3,271,688 | 9/1966 | Gschwind et al. . |
| 3,563,088 | 2/1971 | Sperberg ..................... 73/146 |
| 3,568,147 | 3/1971 | Gilson . |
| 3,704,414 | 11/1972 | Herbst . |
| 3,754,098 | 8/1973 | Abramson et al. . |
| 3,848,586 | 11/1974 | Suzuki et al. . |
| 3,852,535 | 12/1974 | Zurcher . |
| 3,992,580 | 11/1976 | Bittel et al. . |
| 4,009,449 | 2/1977 | Agans . |
| 4,070,618 | 1/1978 | Thomas . |
| 4,166,249 | 8/1979 | Lynch . |
| 4,190,807 | 2/1980 | Weber . |
| 4,242,639 | 12/1980 | Boone . |
| 4,270,183 | 5/1981 | Robinson et al. . |
| 4,275,465 | 6/1981 | Lemoussu . |
| 4,280,224 | 7/1981 | Chethik . |
| 4,280,387 | 7/1981 | Moog . |
| 4,288,874 | 9/1981 | Yamada . |
| 4,320,356 | 3/1982 | Perdue . |
| 4,339,731 | 7/1982 | Adams . |
| 4,380,742 | 4/1983 | Hart . |
| 4,380,743 | 4/1983 | Underhill et al. . |
| 4,472,881 | 9/1984 | Houck ..................... 33/141 E |

Primary Examiner—Donald O. Woodiel
Attorney, Agent, or Firm—Ronald E. Larson; T. P. Lewandowski

[57] ABSTRACT

Tires of vehicles can be accurately tested by providing a voltage controlled oscillator for generating output signals substantially free of jitter. Digital up/down counters responsive to data signals and the output signals generate a counter signal which increases or decreases depending on the relative frequency between the data signals and output signals. A conditioning circuit, including a digital to analog converter and an integrator, is connected between the counters and the signal generator so that the signal generator produces an output signal which tracks the data signal in frequency and so that an output signal is produced for every data signal over a wide range of frequencies.

24 Claims, 6 Drawing Figures

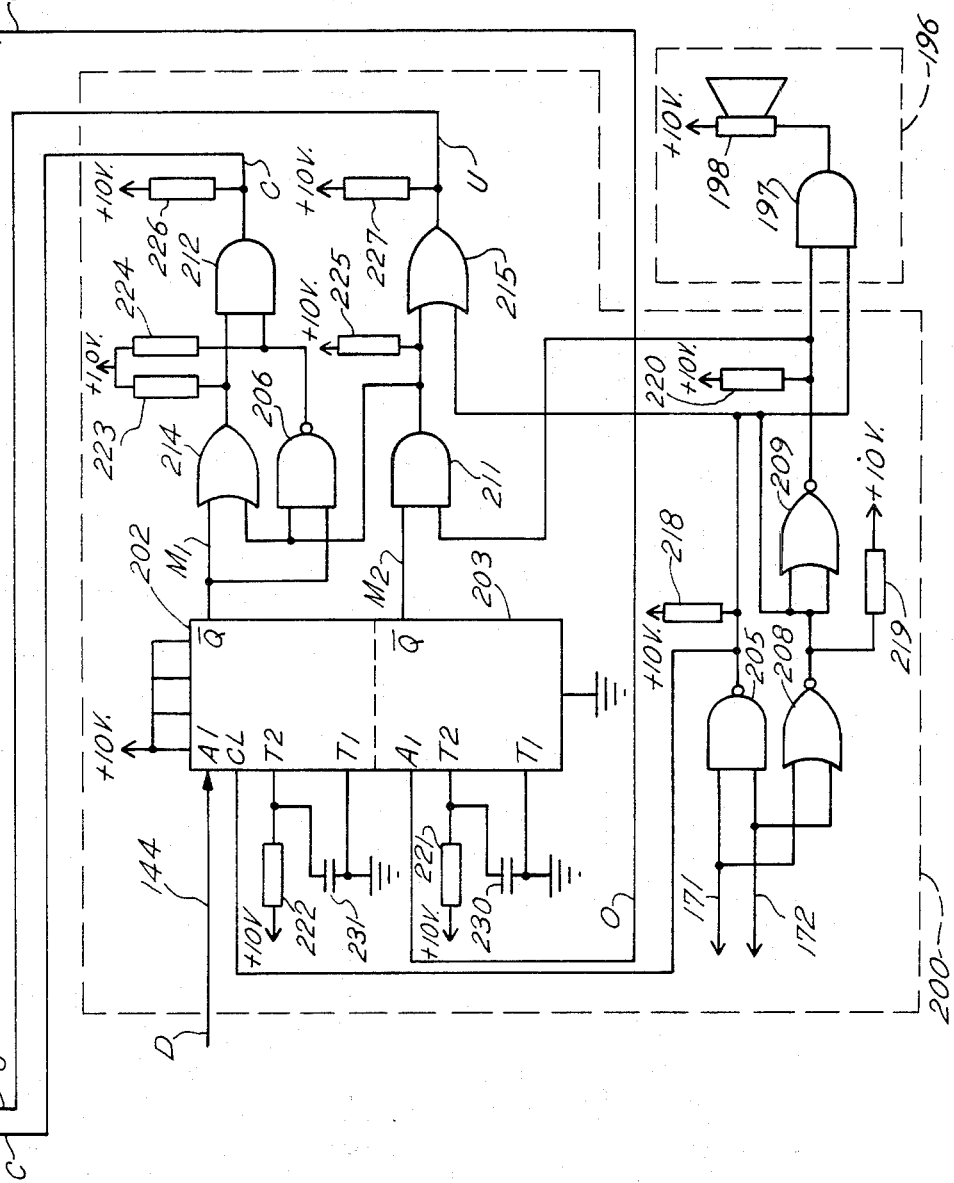

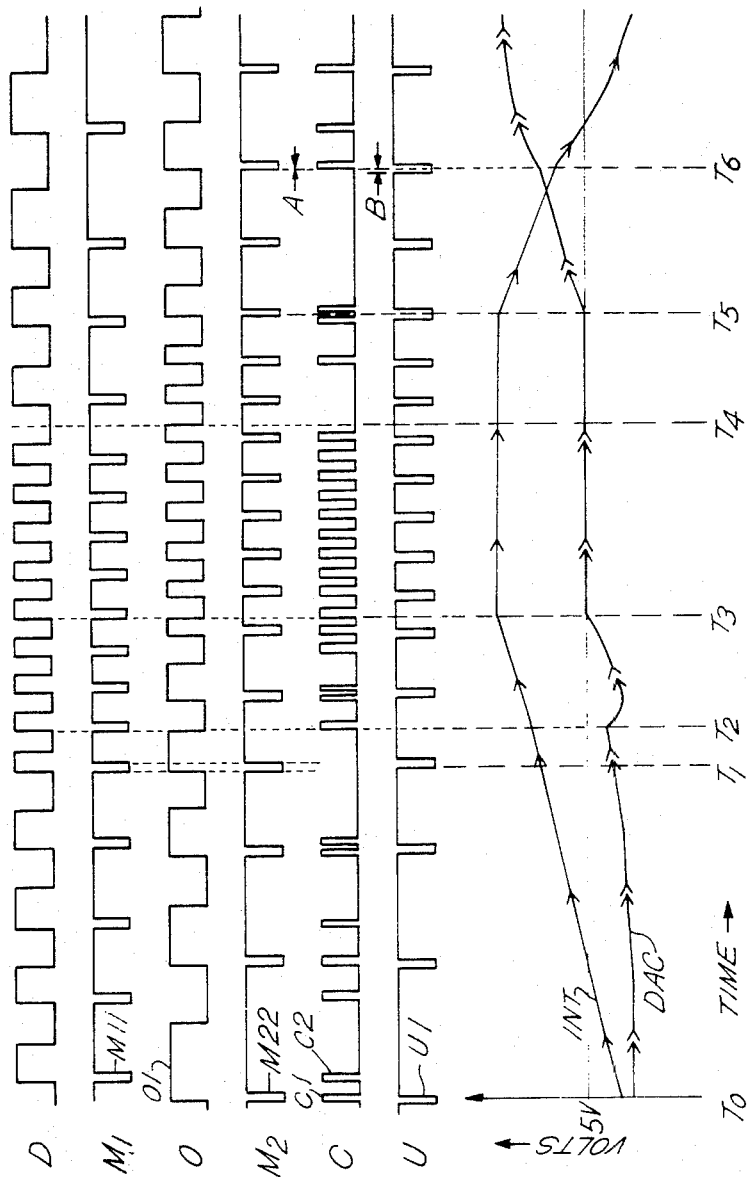

APPARATUS AND METHOD ADAPTED TO TEST TIRES BY ELIMINATING JITTER FROM DATA SIGNALS WITHOUT LOSING DATA

BACKGROUND AND SUMMARY

This invention relates to techniques for testing tires, and more particularly, relates to electronic circuitry which eliminates jitter from data signals without losing data.

The tire industry has long sought an automated method of testing the ability of tires to adhere to the road during emergency braking. As shown in FIG. 1, brake testing is normally performed by mounting test tires on an automobile and attaching a fifth wheel to the rear of the automobile. The fifth wheel includes a device for generating a fixed number of data signals for each revolution of the fifth wheel.

The automobile is accelerated to a constant speed as it approaches a conventional skid pad. At a predetermined point, the brakes are applied. As the brakes are applied, the frequency of the data signals produced by the fifth wheel is continuously monitored. The frequency is at a maximum as the automobile approaches the skid pad, and is reduced to zero when the automobile is fully stopped by the brakes. The number of data signals produced by the fifth wheel is counted between two selected frequencies, the higher frequency being slightly lower than the maximum as the automobile approaches the skid pad, and the lower frequency being slightly higher than zero. The count is proportional to the braking distance.

Unfortunately, the signals produced by the fifth wheel contain a substantial amount of jitter due to road irregularities, car bounce, wheel balance, gear errors and pick-up errors. In the past, the jitter has prevented the signals from being analyzed by a computer. The computer is unable to separate jitter from the data signals, and therefore produces erroneous results.

Various techniques have been devised to adapt computer analysis to brake testing, but each has proved to be insufficient. Monitoring the frequency of the data signals is difficult because the frequency varies over a wide range. For example, frequency determination of low-frequency signals with a microcomputer is usually done by timing each cycle. If this low frequency determination technique is used for higher frequency signals, the timing of each cycle becomes inaccurate. Averaging multiple cycles can improve the situation. However, for low frequency signals, this technique lengthens the sample time, and the lengthening reduces accuracy, especially when the frequency determination must be obtained from changing frequencies, such as in the brake testing of tires.

The known prior art also would not provide a solution to the foregoing problem. For example, U.S. Pat. No. 4,270,183 (Robinson, et al.) discloses a data dejittering apparatus employing a buffer register 18. The apparatus temporarily stores data in a buffer register which is normally maintained in a half full condition. This technique might operate satisfactorily when the data does not deviate too far from a nominal frequency, but would be incompatible in an application, such as tire testing, in which the data varies over a wide frequency range that approaches zero at the lower end of the range.

The prior art also includes a variety of phase locked loop circuits, such as the one shown in U.S. Pat. No. 4,380,742 (Hart), but these circuits also do not appear to provide a solution to the problem. The difficulty with such circuits is that under wide swings of frequency, they tend to lose data input signals temporarily. This is a condition which cannot be tolerated for the brake testing of tires, because every input signal must result in an output signal that is free of jitter.

The applicants have discovered that jitter can be eliminated from data signals produced by data signal generator without losing data by using a unique combination of circuitry. An output signal generator is provided for generating output signals substantially free of jitter. A digital number circuit responds to the data signals and output signals by generating a digital number that remains substantially constant if the frequency of the data signals equals the frequency of the output signals, varies monotonically in a first direction if the frequency of the data signals is greater than the frequency of the output signals and varies monotonically in a second direction opposite the first direction if the frequency of the data signals is less than the frequency of the output signals. The digital number signal is conditioned so that the frequency of the output signals tracks the frequency of the data signals and so that one output signal is produced for every data signal over a wide range of frequencies. If the capacity of the counter is exceeded, an indicator circuit gives an alarm. The operator then knows that data has been lost and that the test must be rerun using a counter of increased capacity.

Use of the foregoing techniques enables jitter to be removed from data signals without losing data. For applications having wide swings in frequency, such as the brake testing of tires, the techniques enable computer analysis of the data with a degree of accuracy and reliability previously unattainable.

DESCRIPTION OF THE DRAWINGS

These and other advantages and features of the invention will appear for purposes of explanation, but not limitation, in connection with the accompanying drawings, wherein like numbers refer to like parts throughout and wherein:

FIG. 3 illustrates the arrangement of FIGS. 3A and 3B;

FIGS. 3A and 3B are electrical schematic drawings of a preferred form of circuitry for eliminating noise and jitter from the signal produced by the pick-up circuit without losing data; and FIG. 4 illustrates wave forms of voltages produced by the circuitry shown in FIG. 3 at the corresponding letters.

DESCRIPTION OF THE PREFERRED EMBODIMENT

Figure 1:
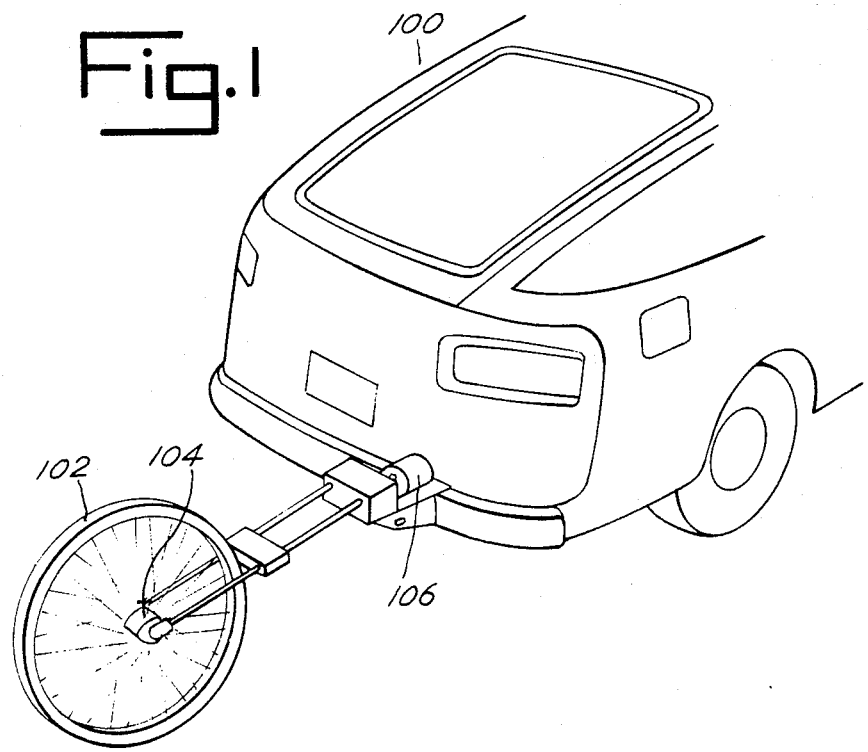
FIG. 1 is schematic illustration of a test wheel mounted to a vehicle in order to facilitate the brake testing of tires.

Referring to FIG. 1, tires are generally tested by mounting them on a vehicle, such as automobile 100. A test wheel 102 having an axle 104 is mounted to the vehicle in the manner shown. A pick-up circuit board 106 is mounted to the wheel in order to produce 50 square wave pulses for each meter that the wheel travels.

Figure 2:
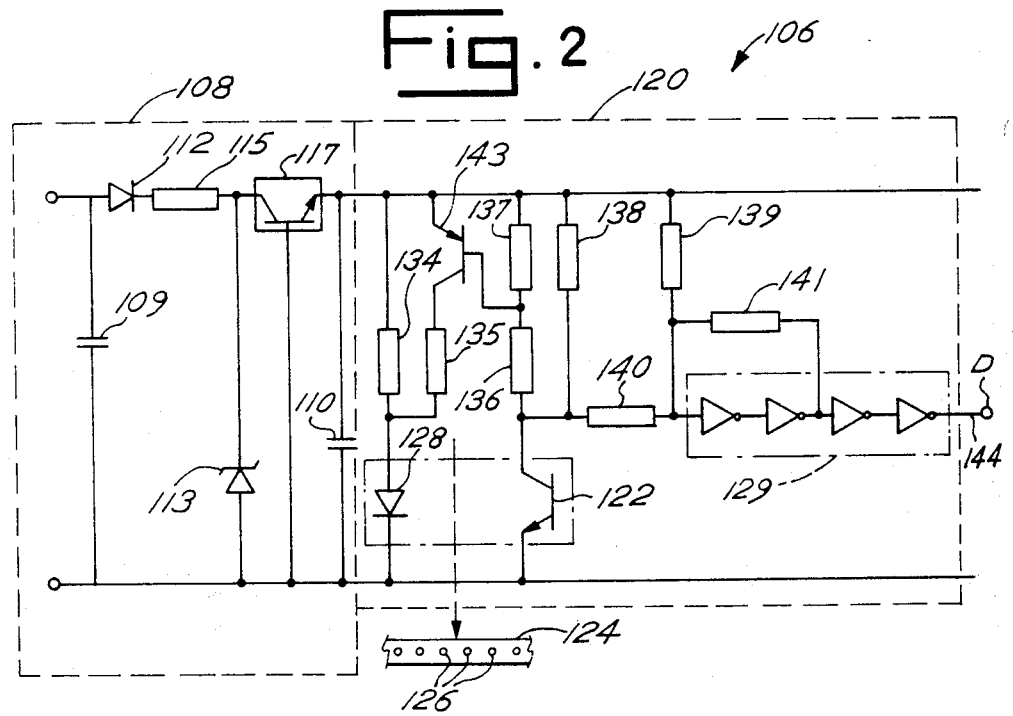
FIG. 2 is an electrical schematic drawing of a preferred form of pick-up circuit for generating a fixed number of pulses for each revolution of the test wheel.

Referring to FIG. 2, pick-up circuit 106 includes a regulated power supply 108 and a pulse generator circuit 120.

Power supply 108 includes capacitors 109 and 110, diodes 112 and 113, a resistor 115 and a voltage regulator 117 connected as shown.

Pulse generator circuit 120 includes a phototransistor 122 that receives illumination from a light emitting diode 128 through a circular mask 124 which has holes 126 drilled at equal intervals. The holes are spaced so that transistor 122 produces 50 pulses each time the wheel moves one meter over the ground. Circuit 120 also includes a C-MOS buffer 129, resistors 134–141, a transistor 143 and an output conductor 144 connected as shown. As illustrated in FIG. 4, circuit 120 produces pulses, such as D, that contain jitter.

Figure 3A:
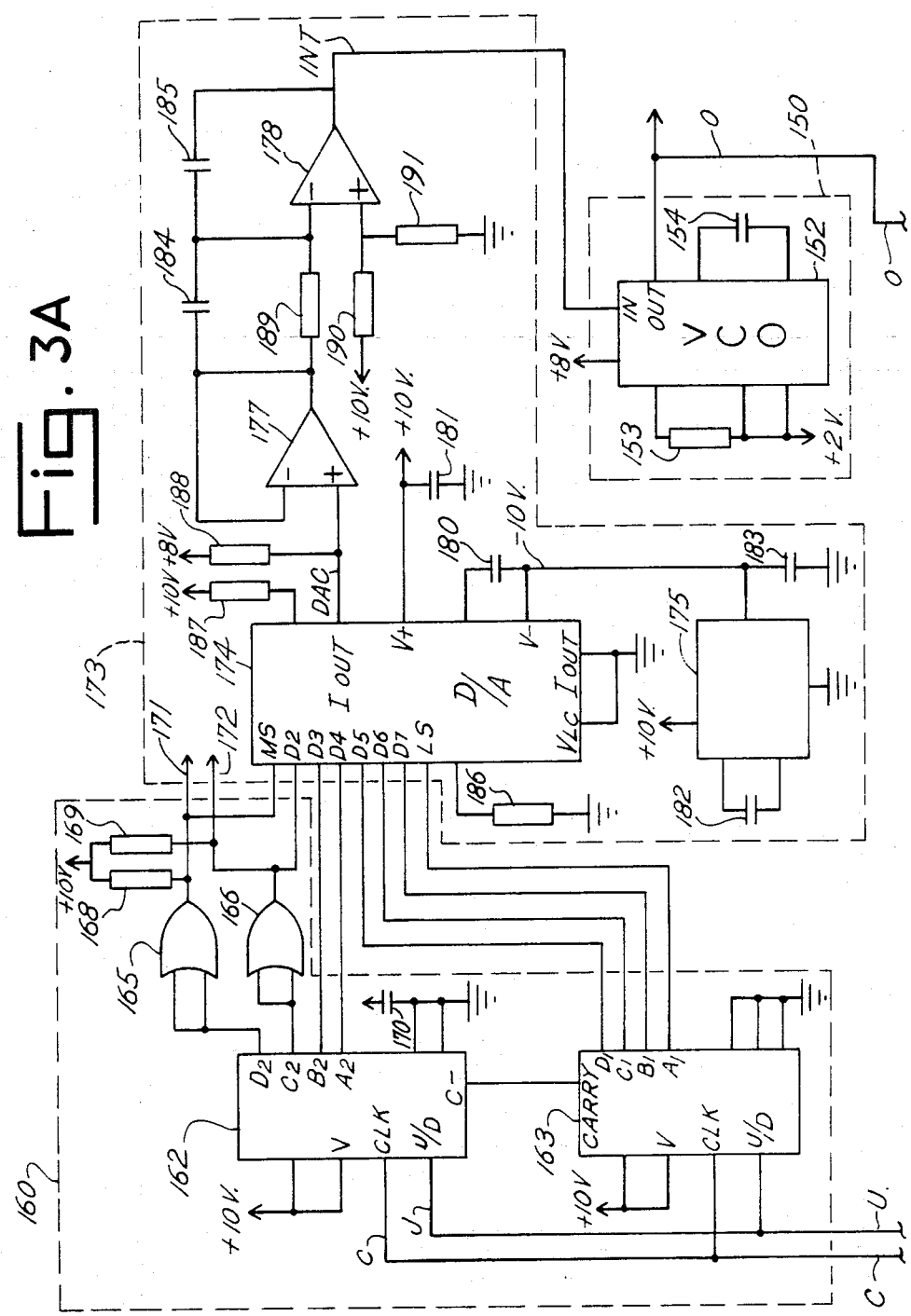

Referring to FIGS. 3A and 3B, a preferred form of circuitry made in accordance with the present invention basically comprises a signal generator 150, a number producing circuit 160, a conditioning circuit 173, an indicating circuit 196 and a control circuit 200.

Signal generator 150 includes a voltage controlled oscillator 152, a resistor 153 and a capacitor 154 connected as shown. The oscillator has a range of 0 to 3000 Hz and produces output signals O free of jitter (FIG. 4).

Number producing circuit 160 includes four-bit counters 162 and 163, OR gates 165 and 166, resistors 168 and 169, a capacitor 170 and output conductors 171 and 172, all connected as shown.

Conditioning circuit 173 includes a digital to analog converter 174, a power supply 175, operational amplifiers 177 and 178, capacitors 180–185 and resistors 186–191, all connected as shown. Opamp 178, capacitor 185 and resistors 189–191 are connected as an integrator.

Indicating circuit 196 includes an AND gate 197 and an audible alarm 198.

Control circuit 200 includes monostable multivibrators 202 and 203, NAND gates 205 and 206, NOR gates 208 and 209, AND gates 211 and 212, OR gates 214 and 215, resistors 218–227 and capacitors 230 and 231, all connected as shown.

Referring to FIGS. 3A, 3B and 4, the circuitry operates in general as follows. Input signals D and output signals O are switched by the logic gates of control circuit 200 (FIG. 3B), so that the D signals cause counters 162 and 163 to count up (FIG. 3A), and the O signals cause counters 162 and 163 to count down. When the frequencies of the D and O signals are equal and the D signal frequency subsequently drops, the down counts outnumber the up counts and the count generally goes down. This results in a higher DAC output voltage from converter 174 (FIG. 3A). Because of this higher DAC voltage, the output voltage INT of opamp integrator 178 drifts down and the VCO 152 output frequency (signal O) decreases, reducing the down counting. After a short time period, the O signal frequency will be equal to the input D signal frequency and the count of counters 162 and 163 is restored to the middle of its range. When the input D signal frequency increases, the count goes up causing a drop in the DAC output voltage. This makes the output of opamp integrator 178 go up and the frequency of VCO 152 increase until the O signal frequency equals the input D signal frequency. When the D and O signal frequencies are equal, counters 162 and 163 are always in the middle of their counting range. If the counters are displaced from the middle of the counting range, then the frequency of the O signal is adjusted to reach the middle of the range. The operating details of the circuitry will now be described.

Number producing circuit 160 gives an indication of the relation between the frequency of data signal D produced by pulse generator circuit 120 and the frequency of output signal O produced by oscillator 152. When the two frequencies are equal, counters 162 and 163 keep substantially the same value. This value changes as soon as the frequencies are different. The counters will then count up or down depending on the relative values of the frequencies. The selection of up/down and the clock input of the counters is generated by monostable multivibrators 202 and 203 and the logic gates in circuit 200.

Within circuit 200, the gates are arranged to produce a clock pulse each time a signal is received from either pulse generator 120 (signal D) or signal generator 150 (signal O). (Simultaneous occurrence of signals D and O is a special case discussed later.) The counters count up in response to the generation of a signal from generator 120 (signal D) and count down in response to the generation of a signal from generator 150 (signal O). This form of operation can be seen with reference to waveforms D, O, M1, M2, C and U in FIG. 4. More specifically, pulse O1 from generator 150 results in pulse M22 from multivibrator 203 that, in turn, generates a low voltage pulse U1, enabling down counting. Pulse M 22 also generates clock pulse C1 that caues the counters to decrement in response to the low voltage of pulse U1. Pulse D1, from generator 120, results in pulse M11 from multivibrator 202 that, in turn, generates clock pulse C2. Since the value of voltage U is high during clock pulse C2, the counters increment. In general, if the number of input signals D from generator 120 exceeds the number of signals O from generator 150 per unit of time, the count increases more often than it decreases, and therefore, generally increases. If the number of input signals D from generator 120 is less than the number of signals O from generator 150 per unit of time, the count decreases more often that it increases, and therefore, generally decreases. The circuit arrangement is an important feature that enables the counters to count up or down without determining whether the signals D or O are in phase or out of phase.

Counters 162 and 163 are wired for parallel clocking. When counter 163 is full, it gives a carry out to counter 162. This carry enables counter 162 to accept the next clock pulse. At this next clock pulse, counter 163 goes from a count of 1111 to a count of 0000, and counter 162 advances one. When counter 163 jumps to 0000, it takes the carry out away, and the clock of counter 162 is blocked until counter 163 is again at a count of 1111. The two most significant bits of counter 162 are buffered by OR gates 165, 166.

The counters should be designed so that their capacities are not exceeded during normal usage. When the frequencies of signals D and O are different, the counters go up or down. If the difference remains too long, the counters could jump to a wrong value if the capacities are exceeded. This wil be explained by an example.

Assume that the input frequency of signal D is much higher than the frequency of signal O. This causes the counters to count up rapidly, which results in an increasing frequency of signal O. After the counters are at 11111111, at the next up clock pulse, the counters go to 00000000. The circuit interprets this count as an excessive signal O frequency, which is actually too low.

However, since the capacity of the counters has been exceeded, the circuit incorrectly lowers the signal O frequency even more. This causes the counters to continue to count up. The signal O frequency decreases until the counters exceed the middle of their range. Then the circuit reacts as if the signal O frequency is too low, and the signal O frequency begins to increase again. Because the actual frequency difference has increased, again the counters may increase their count to 11111111 and jump to 00000000. The foregoing operation results in an unstable signal O output. The same situation will occur if the capacity of the counters is exceeded during a drop in frequency of signal D. Then the counters will go from count 00000000 to count 11111111, and the O signal frequency will become bigger and bigger. Then too the operation is unstable.

To overcome this problem, the two most significant bits of the counters (i.e., C2 and D2) are decoded with NAND gate 205. If the frequency of the O signal needs to be increased, and the count increases to the upper limit of 192 (i.e., 11000000 in binary), the two most significant bits are high (i.e., 1's). The NAND gate output then is low and multivibrator 202 is disabled. No more "up" pulses can come to the counters. During the increase of the count, the O signal frequency is taken higher. Eventually, this will cause a down counting, the O signal frequency will be higher than the D signal frequency. Also, because of this, the count will go through its middle value (i.e., 128) which will cause a lower O signal frequency. After a few more clock cycles, both frequencies will be equal and the operation will be stable again.

The lower limit occurs when the two most significant bits of the count are low, at count 63 (i.e., 00111111 in binary). Then the output of multivibrator 203 must be blocked, and the up/down counter selection must select up counting. Because the output of multivibrator 203 is also the up/down selection, it cannot be blocked like multivibrator 202. When multivibrator 203 is blocked, its output goes low, which would select down counting. Therefore, the output is switched by AND gate 211 and OR gate 215. NOR gates 208 and 209 decode when the two most significant bits of counter 162 are low. When this occurs, NOR gate 208 goes high and NOR gate 209 goes low. NOR gate 209 is wired as an inverter. The low output of NOR gate 209 blocks the output of monostable multivibrator 203 by setting the output of AND gate 211 low. OR gate 215 gets a low input from AND gate 211 and a high input from NOR gate 208. The up/down selection goes high so the counters can only count up. When the first count up appears after the blocking, the count goes to 01000000, which will unblock the count down pulse. If the O signal frequency is still higher than the D signal frequency, the counter will receive a down pulse and will block again. Otherwise, the count up will drive the count to its middle value and stable operation will resume. Then, the O signal and D signal frequencies are equal.

For tire testing purposes, every input pulse must result in an output pulse. When the counters are against their upper or lower limits, the system will lose or gain pulses, and the result based on the O signals is inaccurate. This situation is indicated with audible alarm 198. It is important that the counters do not reach either of their limits. For tire testing, a counter range between 00111111 (i.e., 63) and 11000000 (i.e., 195) is adequate. The middle is at 10000000 (i.e., 128), and the sweep from the middle is either up or down a maximum of 64 pulses. For other applications, the range of the counters may need to be expanded.

The circuitry shown in the drawings requires a delay of at least 140 ns between the up/down and clock pulses to the counters. 140 ns is the necessary time for setting the up or down mode in the counters when switching from one mode to another. Only after the setting of the mode will a pulse at the clock input result in a count operation. The mode is mostly in the up position. This condition changes only when a pulse from multivibrator 203 to changes the mode to a down count. Between this down selection and the leading edge of the next clock pulse, there has to be the minimum time of 140 ns. The output of multivibrator 203 has two gate delays before reaching the up/down counter input while the output of multivibrator 202 has three gate delays before reaching the counter clock input. This delay caused by the extra gate is about 400 ns. The down count is only selected for one microsecond, because this is the pulse width of the monostable multivibrator output.

The circuitry prevents an up pulse from appearing during down selection. If up and down pulses would appear at the same time, they would both be blocked from the counter clock input by OR gate 214 and counting would be inhibited.

When the O signal and D signal frequencies are equal, the converter output DAC is 5 volts. Then there will be no input current in opamp 178 and capacitor 185 will stay at its existing voltage. In case the D signal frequency changes, the circuitry will react to compensate for the difference. For example, assume that the counters start counting up from their middle value. The converter output voltage on resistor 188 will start drifting down because the output current increases. The voltage at the output of follower opamp 177 will also go down, resulting in an increasing input current of integrator opamp 178. This negative input current flows from the inverting input to the follower opamp output. The capacitor current goes from capacitor 185 into the inverting input to balance the input current. The integrator output voltage INT drifts up. Because the integrator output is coupled to the VCO 152 input, the O signal frequency will increase until the converter output is again at 5 volts. The integrator output INT will then stabilize and so will the O signal frequency.

When the counters start counting down, the converter output goes above 5 volts, and the integrator output INT drifts down until the O signal frequency equals the D signal frequency. Then the converter output is again at 5 volts. Resistor 189 is decoupled with a 1 microfarad capacitor 184 to allow jumps in the converter output to appear faster in the integrator than would be possible through resistor 189 alone. This is an important feature that allows rapid response to frequency changes.

FIG. 4 is a timing diagram which shows the voltage wave forms of the like-lettered portions of circuitry in the FIG. 3. In certain instances, the pulses and the delays between pulses are not drawn to scale. For instance, detail B is exaggerated to better show the relationship between the up/down selection pulse and the counter clock pulse.

As shown in FIG. 4, the input data signal D provides an example of a situation in which the input frequency is relatively slow from time T0 to time T1, then rapidly increases from time T1 to T2, and slows down again after time T4. At time T0, the D signal frequency is greater tha the O signal frequency, so the converter 174 output voltage DAC rises in order to increase the O signal frequency. At time T1, outputs from multivibrators 202 and 203 appear at the same time, but they are both blocked and do not appear as a clock pulse C. At time T2, the input frequency of the D signal has doubled. The counters count higher, thereby causing the converter output to decrement. As a result, the integrator output (INT) from operational amplifier 178 drifts faster upward. At time T3, the D signal and O signal frequencies are equal. The counters are in the middle of their range, and the converter output is at 5 volts. The integrator output INT is at a stable voltage.

The D signal and O signal frequencies remain equal until time T4, when the D signal frequency begins to decrease. At time T5, the D signal frequency has decreased substantially, and the counter count decreases, thereby causing the converter output voltage DAC to increase. Also, at time T5, the integrator voltage INT starts decreasing. At time T6, the D signal frequency decreases further. The counter count decreases more, the converter output DAC increases more rapidly, and the integrator output INT decreases more rapidly as well. Detail A of FIG. 4 attempts to illustrate the time delay of about 600 nano seconds between the outputs of multivibrators 202 and 203 and the initiation of the pulse to the clock input of the counters.

When the invention is used to test the braking capability of tires, the test wheel, as shown in FIG. 1, is attached to a vehicle which is fitted with tires to be tested. As is well known, the tests are carried out on a skid pad. The vehicle approaches the skid pad at a constant speed. At a predetermined point, the brakes of the vehicle are applied, and the frequency of the D signal begins to decrease. As shown in FIG. 4, the D signal contains a substantial amount of jitter that would normally prevent evaluation of the D signal by digital computer apparatus. However, the illustrated circuitry removes the jitter to produce an O signal having a frequency that tracks the frequency of the D signal and that loses no D signal pulse as long as the capacity of the counters is not exceeded.

Conventional computer-type circuitry can be used to analyze the O signals. Basically, the computer circuitry continuously monitors the frequency of the O signal and measures the number of O signal pulses between two preselected frequencies, the higher frequency being slightly lower than the frequency produced as the vehicle approaches the test pad and the lower frequency being substantially zero or slightly above, the total count of impulses between the two preselected frequencies is proportional to the braking distance. Normally, the ratio of the higher frequency to lower frequency is at least 20:1.

By using the foregoing circuitry, tires may be tested for braking ability with a degree of accuracy and ease heretofore unavailable.

Those skilled in the art will recognize that only a single embodiment of the invention has been described herein. Changes and modification can be made to the preferred embodiment without departing from the true spirit and scope of the invention as defined in the appended claims. For example, the invention can be used for various forms of industrial control and regulation in which low-frequency signals are analyzed by a computer, such as counting cords in a tire.

What is claimed is:

1. A method of testing tires comprising:
   mounting the tires on a vehicle;
   connecting to the vehicle a data signal generator for generating data signals having a period representing the distance traveled by the vehicle;
   generating output signals substantially free of jitter;
   generating a number signal in response to said data signals and said output signals, said number signal representing a digital number that remains substantially constant if the frequency of the data signals equals the frequency of the output signals, varies generally in a first direction if the frequency of the data signals is greater than the frequency of the output signals and varies generally in a second direction opposite the first direction if the frequency of the data signals is less than the frequency of the output signals; and
   conditioning the number signal so that the frequency of the output signals tracks the frequency of the data signals over a substantial range of frequencies, whereby the number of output signals produced when the frequency of the data signals decreases from a first predetermined frequency to a second predetermined frequency can be counted by a digital computer so that the braking performance of the tires can be measured.

2. A method, as claimed in claim 1, wherein the step of conditioning comprises the steps of:
   converting the number signal from digital to analog form; and
   integrating the analog form of the number signal.

3. A method, as claimed in claim 2, and further comprising the step of indicating that the digital number is at least as high as a predetermined upper count limit or indicating that the digital number is at least as low as a predetermined lower count limit.

4. A method, as claimed in claim 3, and further comprising the step of preventing the digital number from being substantially greater than said upper count limit and from being substantially less than said lower count limit.

5. A method, as claimed in claim 1, wherein the ratio of the first predetermined frequency to the second predetermined frequencies is at least 20:1.

6. A method, as claimed in claim 5, wherein the second predetermined frequency is substantially zero.

7. Apparatus for eliminating jitter from data signals produced by a data signal generator without losing data comprising:
   signal generator means for generating output signals substantially free of jitter;
   digital number producing means responsive to said data signals and said output signals for generating a number signal representing a digital number that remains substantially constant if the frequency of the data signals equals the frequency of the output signals, varies generally in a first direction if the frequency of the data signals is greater than the frequency of the output signals and varies generally in a second direction opposite the first direction if the frequency of the data signals is less than the frequency of the output signals; and
   means for conditioning the number signal so that the frequency of the output signals tracks the frequency of the data signals and so that one output signal is produced for every data signal over a wide range of frequencies.

8. Apparatus, as claimed in claim 7, wherein the signal generator means comprises a voltage controlled oscillator.

9. Apparatus, as claimed in claim 8, wherein the digital number producing means comprises a bidirectional digital counter.

10. Apparatus, as claimed in claim 9, wherein the means for conditioning comprises a digital to analog converter.

11. Apparatus, as claimed in claim 10, wherein said means for conditioning further comprises an integrator including a series input resistor.

12. Apparatus, as claimed in claim 11, wherein said integrator includes a capacitor connected in parallel with said series resistor.

13. Apparatus, as claimed in claim 9, and further comprising means for indicating that the digital counter has counted to a number at least as high as a predetermined upper count limit and for indicating that the digital counter has counted to a number at least as low as a predetermined lower count limit.

14. Apparatus, as claimed in claim 13, and further comprising control means for preventing the digital counter from counting to a number substantially greater than said upper count limit and from counting to a number substantially less than said lower count limit.

15. Apparatus, as claimed in claim 14, wherein the control means further comprises means for preventing pulses responsive to the output signals and the data signals from reaching the digital counter simultaneously.

16. Apparatus, as claimed in claim 7, wherein said data signal generator comprises a mechanically driven signal generator capable of generating signals over a range of frequencies wherein the ratio of the highest frequency in the range to the lowest frequency in the range is at least 20:1.

17. Apparatus, as claimed in claim 16, wherein the lowest frequency in said range is substantially zero.

18. Apparatus, as claimed in claim 16, wherein the mechanically driven signal generator further comprises a wheel adapted to be moved by a vehicle.

19. A method of eliminating jitter from data signals without losing data comprising:

generating output signals substantially free of jitter;

generating a number signal in response to said data signals and said output signals, said number signal representing a digital number that remains substantially constant if the frequency of the data signals equals the frequency of the output signals, varies generally in a first direction if the frequency of the data signals is greater than the frequency of the output signals and varies generally in a second direction opposite the first direction if the frequency of the data signals is less than the frequency of the output signals; and conditioning the number signal so that the frequency of the output signals tracks the frequency of the data signals and so that one output signal is produced for every data signal over a substantial range of frequencies, whereby the number of output signals produced when the frequency of the data signals decreases from a first predetermined frequency to a second predetermined frequency can be counted by a digital computer.

20. A method, as claimed in claim 19, wherein the step of conditioning comprises the steps of:

converting the number signal from digital to analog form; and integrating the analog form of the number signal.

21. A method, as claimed in claim 20, and further comprising the step of indicating that the digital number is at least as high as a predetermined upper count limit or indicating that the digital number is at least as low as a predetermined lower count limit.

22. A method, as claimed in claim 21, and further comprising the step of preventing the digital number from being substantially greater than said upper count limit and from being substantially less than said lower count limit.

23. A method, as claimed in claim 19, wherein the ratio of the first predetermined frequency to the second predetermined frequencies is at least 20:1.

24. A method, as claimed in claim 23, wherein the second predetermined frequency is substantially zero.

* * * * *